Dec. 22, 1931.   B. F. BAILEY   1,837,394
INDUCTION MOTOR
Original Filed Feb. 18, 1927
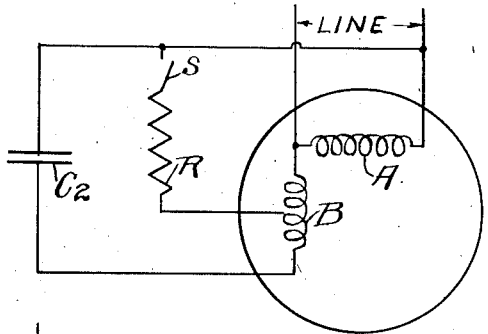
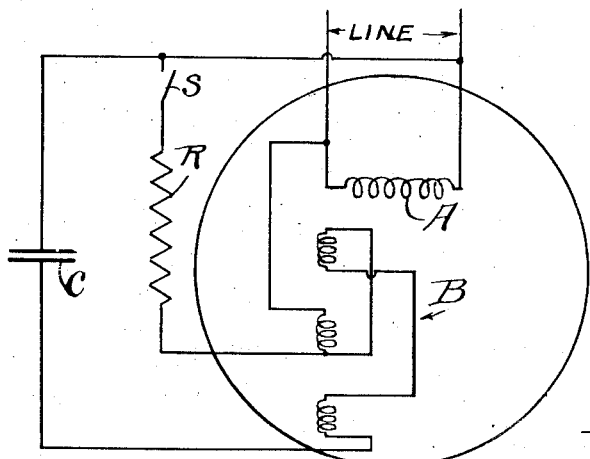
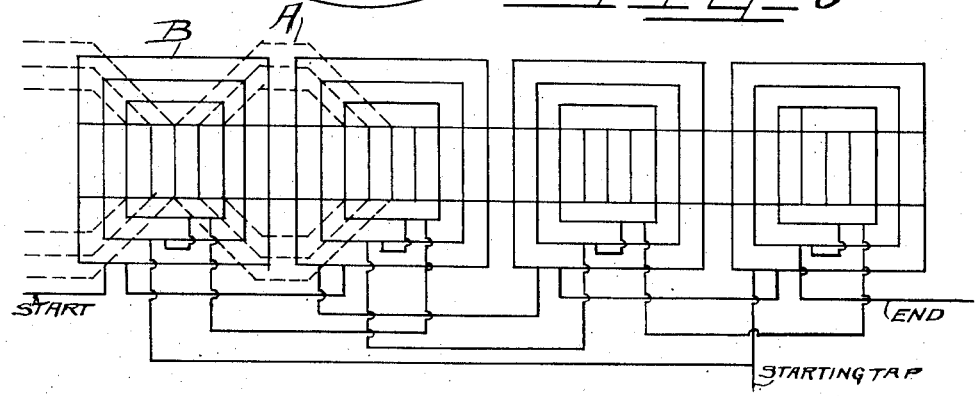
Inventor
Benjamin F. Bailey Patented Dec. 22, 1931

1,837,394

UNITED STATES PATENT OFFICE

BENJAMIN F. BAILEY, OF ANN ARBOR, MICHIGAN, ASSIGNOR TO REGENTS OF THE UNIVERSITY OF MICHIGAN, A CORPORATION OF MICHIGAN

INDUCTION MOTOR

Original application filed February 18, 1927, Serial No. 169,165. Divided and this application filed November 2, 1928. Serial No. 316,664.

This invention relates to an induction motor and particularly to an induction motor which may be economically constructed and which at the same time has good running and satisfactory starting characteristics.

In my copending application for patent for an induction motor, filed February 18, 1927, Serial No. 169,165, patented April 2, 1929, No. 1,707,424, of which this is a division, I have disclosed a motor having two windings, approximately 90° different in phase, and means for connecting the windings in circuit association with condensers and power supply lines.

It is an object of this invention to provide an alternating current motor having two windings in electrical quadrature relation to each other, one of said windings being so arranged that when a selected portion thereof is used that portion will also be in electrical quadrature relation to the other whole winding.

It is a further object of this invention to provide an alternating current motor having two windings in electrical quadrature relation to each other, one of said windings comprising coil groups of unequal impedances so arranged that the coil group having the least impedance is also in electrical quadrature relation to the other whole winding.

It is also an object of my invention to provide a circuit arrangement including the novel winding of my invention and control means so that upon the closing of a switch, current is directed through a portion only of my novel winding to obtain a high starting torque in the motor, and that upon the opening of said switch the said winding is in series with means to ensure the operation of the motor at a desired high power-factor.

Other and further important objects of this invention will be apparent from the disclosures in the specification and the accompanying drawings, in which:

Figure 1 is a diagrammatic view illustrating an embodiment of my invention.

Figure 2 is a further diagrammatic view illustrating an embodiment of my invention.

Figure 3 is a detail view, in diagrammatic form, of a novel winding arrangement of my invention.

As shown in the drawings:

In Figure 1 I have illustrated a single phase induction motor having two windings, A and B, in space quadrature. During the normal operation of the motor, the winding A, usually known as the "main" winding, is connected directly across the power supply lines, and the winding B, usually designated the "starting" winding, is connected to the power supply lines in series with a condenser $C_2$. I find that, in practice, it is frequently desirable to have more turns in the winding B than in the winding A, because then a condenser $C_2$ having a relatively low capacity, and of relatively low cost and small size may be used. If, however, the winding B has many turns compared with the winding A, it is impossible to secure sufficient starting torque when the starting winding B is connected across the power supply lines in the usual manner. To retain the advantages of relatively many turns in the winding B and at the same time to obtain sufficient torque at starting, I have devised the arrangement shown in Figure 1. A portion only of the winding B is connected to the power supply lines temporarily through a resistor R at starting. The switch S is closed to start the motor and is held open during normal operation of the motor.

It is desirable that not only should the winding B, as a whole, be in quadrature with the winding A, but that the portion of the winding B through which the starting current flows should also be in quadrature with the winding A.

One method of securing this result is shown in Figure 3. In this figure, I have illustrated the winding of a 4-pole motor having 36 slots. The winding A is indicated by dotted lines and the winding B by full lines. The connection of the winding A is the same as that in any ordinary motor and is not shown. Normally the three coils of each of the four groups would be connected in series thus forming four groups. These four groups would then be connected in series in such a way that the currents around adjacent groups would be in opposite directions. This is merely one of the well known ways of connecting a single phase motor.

The winding B in my invention would, however, be connected as illustrated so that the current would pass around the four largest coils of the B winding in the proper direction and a starting tap would be brought out after the current had passed through these four largest coils. The winding would then continue so that the current would pass through the smaller coils in the usual way. With this connection, the B winding, as a whole, would be at right angles electrically to the A winding and this would also be true of the portion used in starting.

I do not wish to confine myself to the precise connection described above as it might prove desirable to pass first through all the middle sized coils or even through all the smallest coils. Other obvious modifications will readily occur to those skilled in the art pertaining to such windings.

In some machines having a winding in which as many coils as slots are used, the coils are all of the same dimensions and are placed at an angle so that they overlap one another. As an illustration of the way in which I would use such a winding I will assume a 4-pole motor having 24 slots and 24 coils. Numbering the coils consecutively around the machine (the numbers being arbitrarily chosen and not being reference numerals on the drawings), coils 1, 2, 3; 7, 8, 9; 13, 14, 15; 19, 20 and 21 would be connected in one winding. The coils 1, 2 and 3 constitute a polar group. They would be connected in series in such a way that the direction of the current would be the same in all of them. Similarly 7, 8, 9 would form a polar group as would 13, 14, 15 and 19, 20 and 21. The four groups would be connected in series, the connections being such that the current would pass in opposite directions in adjacent groups.

The remaining twelve coils might be connected in the following order: 5, 11, 17, 23, 4, 6, 10, 12, 16, 18, 22, 24. The connections should be such that the current in coils 4, 5, 6, 16, 17 and 18 would be in the opposite direction from that in coils 10, 11, 12, 22, 23, 24. A tap would be brought out between coils 23 and 4 and the coils 5, 11, 17 and 23 used in starting. It will be apparent to those familiar with armature windings that the coils 5, 11, 17 and 23 will constitute a winding at 90 electrical degrees from the first or "main" winding. I have indicated this diagrammatically in Figure 2, where the "starting" coil of each of the polar groups of the winding B is shown in the center of the group.

I can also accomplish my object in the following way: The main winding would be connected in any of the well known ways, for connecting single phase windings. The starting winding would be arranged to be at an angle of 90 electrical degrees from the main winding. In the starting winding, each of the usual coils would be replaced by two coils. They would usually be wound with the same size of wire but with different numbers of turns. Each of the sets of starting coils would be connected in the usual manner and the two sets connected in series. A tap would be brought out from the junction point of the two sets of coils. During the starting period, the current would be led through one set of coils but both would be used during normal running, the external connections being as shown in Figure 2. By adopting this method, the distribution of current in the starting winding would be the same during starting as during the running period. This is highly desirable in order that I may obtain the greatest possible starting torque for a given current.

It will be noted that, because of my circuit arrangement, when the switch S is closed to start the motor, the condenser C and the greater portion of the starting winding is shunted by the resistor R. Thus, the portion of the starting winding not relied on to provide the quadrature field component is closed in a circuit which includes the impedances C and R. When the motor has attained normal speed the switch S is opened. Because the switch is shunted by the aforesaid circuit immediately before it is opened, it is obvious that the duty at opening is very light, and that sparking at the contacts of the opening switch has been practically obviated.

It will thus be apparent that I have provided an induction motor which may be simply and economically constructed and wherein the auxiliary apparatus may be kept at a minimum of size and constructed inexpensively. A motor constructed and equipped in accordance with the present invention, for reasons previously noted herein, should have sufficiently good starting characteristics and such superior running characteristics as to make it very desirable for use in many classes of work.

I am aware that numerous details of construction may be varied through a wide range without departing from the principles of this invention, and I therefore do not purpose limiting the patent granted, otherwise than necessitated by the prior art.

What is claimed is:

1. In an alternating current motor, a phase winding, a second phase winding, a condenser having one of its terminals connected to one end of said second winding, a resistor, and conductor means connecting said resistor to the other terminal of said condenser, and to a point intermediate the ends of said second winding, whereby said condenser and a portion of said second winding is shunted by said resistor.

2. In an alternating current motor, power lines, a winding connected across said power lines, a condenser, a second winding connected to said power lines in series with said condenser, and an impedance, said impedance being adapted to be connected to a point intermediate the ends of said second winding and to a terminal of said condenser connected to a power line.

3. In an alternating current motor, power lines, a winding connected across said power lines, a condenser, a second winding connected to said power lines in series with said condenser, a resistor, and conductor means connecting said resistor and said second winding and said condenser whereby said resistor is connected in shunt with a circuit comprising said condenser and a portion of said second winding in series with said condenser.

4. In an alternating current motor, power lines, a winding connected across said power lines, a condenser, a second winding connected to said power lines in series with said condenser, a switch, an impedance, and conductor means connecting said switch, said impedance, said second winding and said condenser, whereby said impedance is connected in shunt with a circuit including said condenser and a portion of said second winding in series with said condenser.

5. In an alternating current motor of the class described, power lines, a winding connected across said power lines, a condenser, a second winding connected to said power lines in series with said condenser, an impedance, and means adapted to disconnectably connect said impedance to a point intermediate the ends of said second winding and to a terminal of said condenser connected to a power line.

6. In an alternating current motor, power lines, a winding connected across said power lines, a condenser, a second winding connected to said power lines in series with said condenser, said second winding comprising coil groups of unequal impedances, a resistor, and means disconnectably connecting said resistor in shunt with a circuit including said condenser and that portion of the coil groups of said second winding having the greater impedance.

7. In an alternating current motor, power lines, a winding connected across said power lines, a condenser, a second winding connected to said power lines in series with said condenser, said second winding comprising coil groups of unequal impedances, an external impedance, and means connecting the coil groups of least impedance to said power lines in series with said external impedance to start the motor.

8. In an alternating current motor, power lines, a winding connected across the power lines, a condenser, a second winding normally connected to the power lines in series with the said condenser while the motor is running, a resistor, means arranged to connect a portion of the said second winding and the said resistor in series across the power lines to start the motor, and means arranged to close a circuit including a condenser and a portion of the said second winding in series circuit association therewith while the motor is being started.

In testimony whereof I have hereunto subscribed my name at Ann Arbor, Washtenaw County, Michigan.

BENJAMIN F. BAILEY.